UNITED STATES PATENT OFFICE.

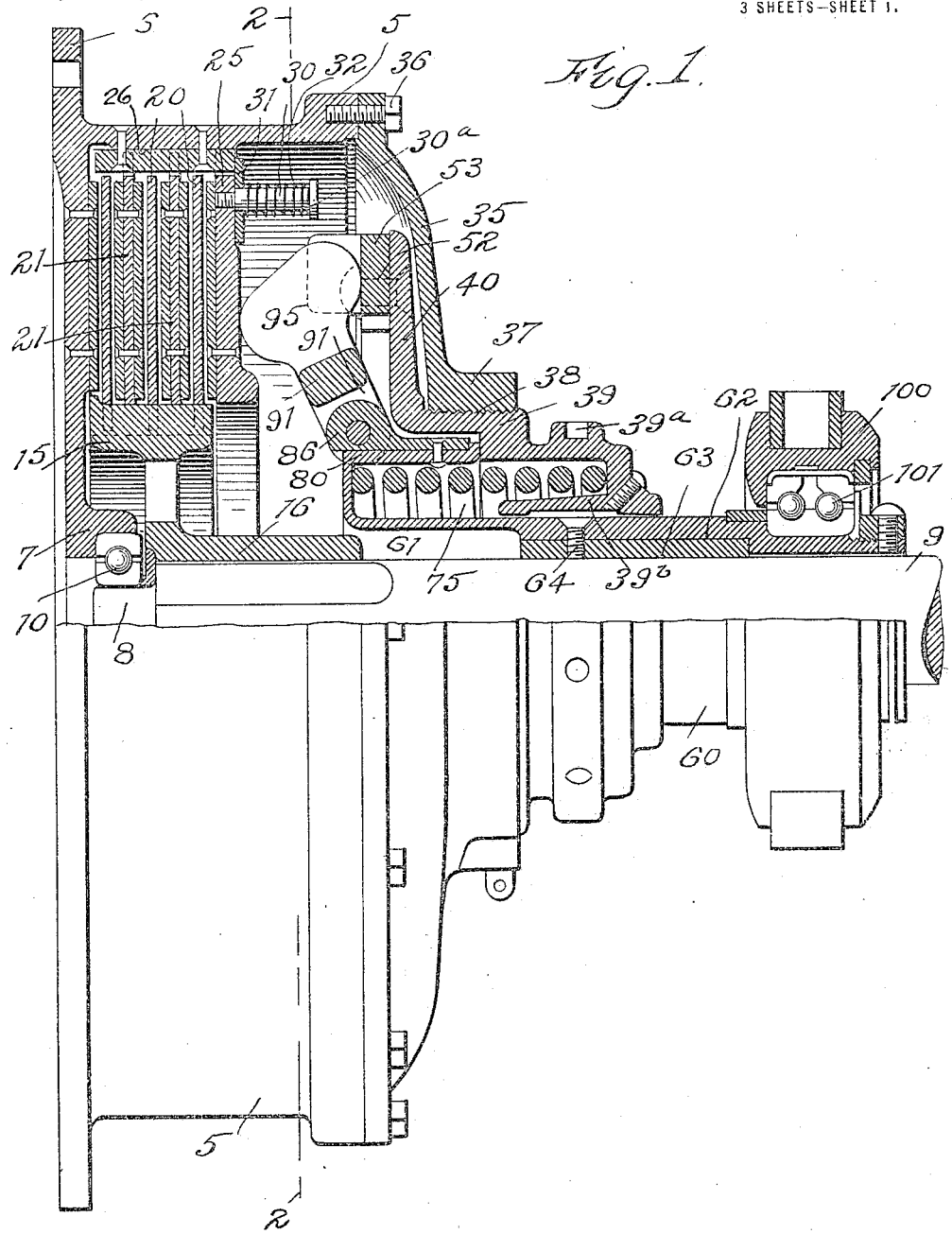

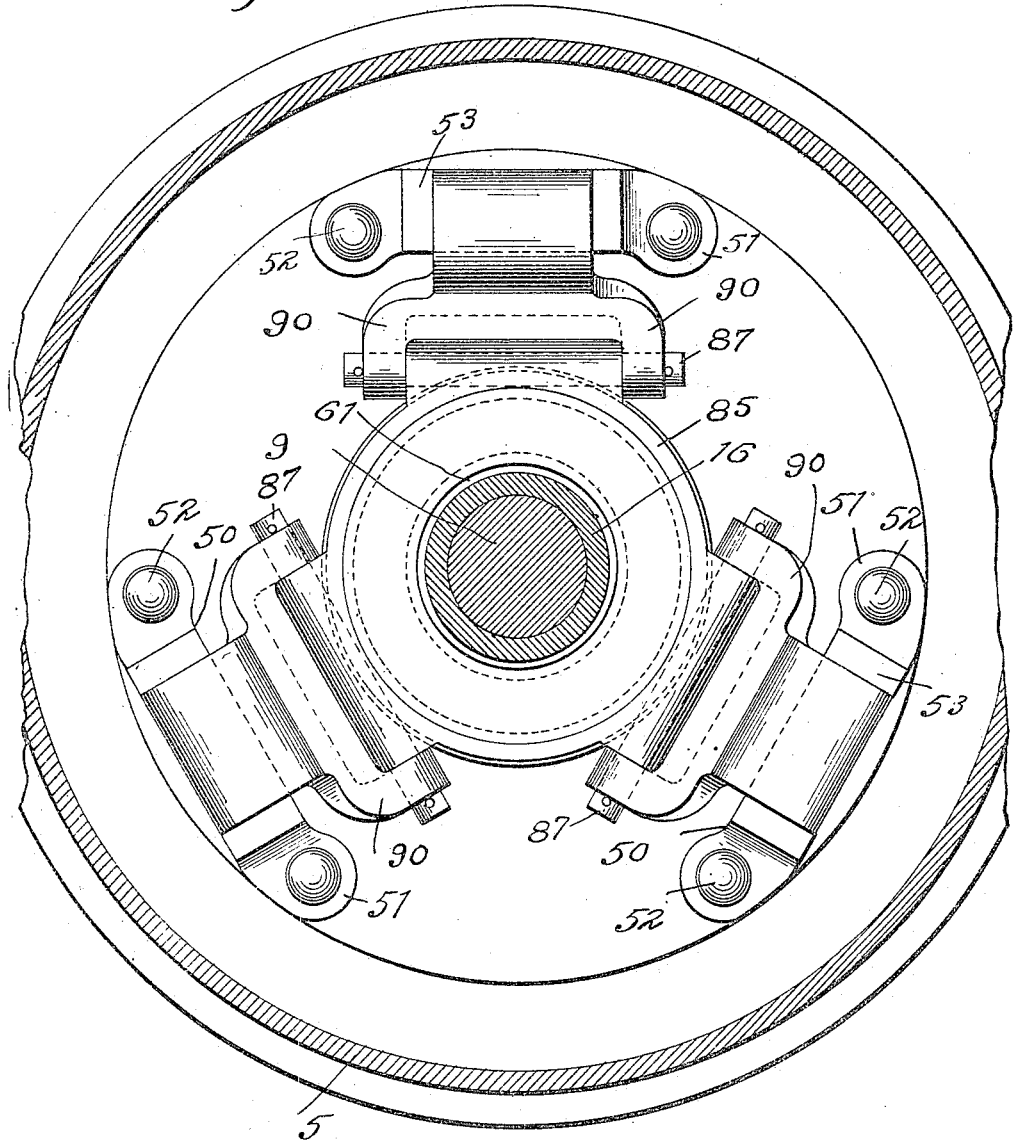

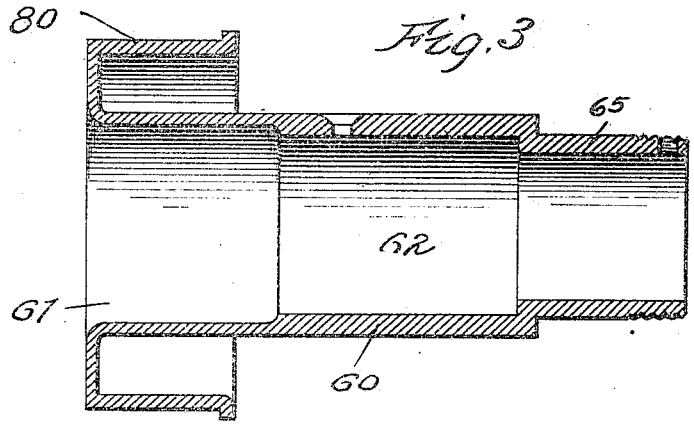
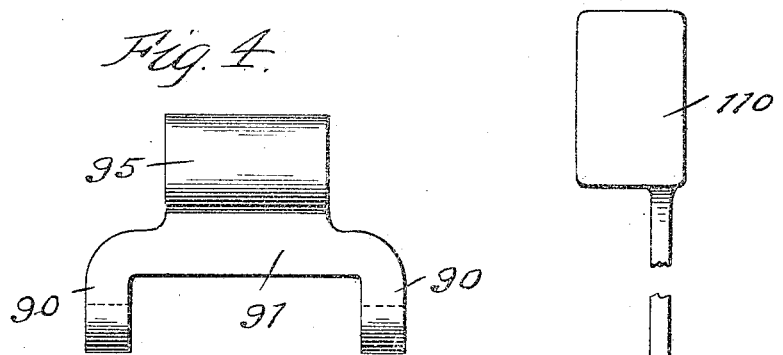
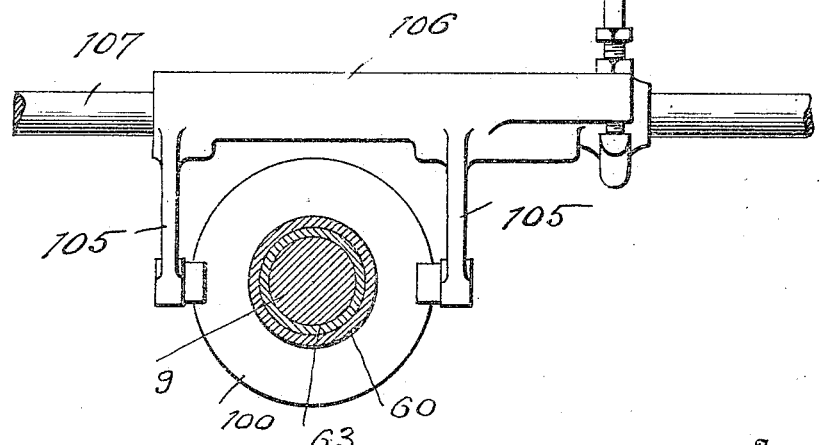

WILLIAM G. HAWLEY, OF ELMIRA, NEW YORK, ASSIGNOR TO AMERICAN LA FRANCE FIRE ENGINE CO., INC., OF ELMIRA, NEW YORK, A CORPORATION OF NEW YORK.

FRICTION-CLUTCH.

1,294,800.  Specification of Letters Patent.  Patented Feb. 18, 1919.

Application filed August 4, 1917. Serial No. 184,508.

*To all whom it may concern:*

Be it known that I, WILLIAM G. HAWLEY, a citizen of the United States, residing at Elmira, in the county of Chemung and State of New York, have invented certain new and useful Improvements in Friction-Clutches, of which the following is a full and clear specification.

The present invention relates to improvements in the construction of the type of dry plate friction clutches, now extensively used upon motor trucks and automobiles, in which the driving and driven members are provided with alternated friction plates and the clutch operating mechanism is usually actuated by a spring for pressing together the two sets of plates to frictionally lock the clutch members together.

The present improvements relate to the operating mechanism of the clutch. A plurality of floating cam arms are pivotally anchored at their inner ends upon a spring actuated axially movable frame or spider, with their outer ovate cam ends supported within the clutch casing between an adjustable fulcrum plate and the follower plate of the clutch. The fulcrum plate for the floating cams is adjustably mounted in the clutch casing (preferably carried by the driving member of the clutch) by forming in the back wall of the clutch casing an enlarged internally threaded hub and a corresponding externally threaded hub upon the adjustable fulcrum member. With this type of clutch the operating cams are thrown into action by the normal operation of an expansion spring and drawn out of action for releasing the clutch by a manually controlled foot lever suitably connected with the cam carrying spider. The operating spring is preferably mounted between telescoping collars carried respectively by the adjustable fulcrum member and the cam-carrying spider, with the result that the adjustment of the fulcrum member in the clutch casing carries with it the clutch operating spring and its spider and the cams that are mounted thereon. The tubular sleeve or collar of the cam-carrying spider is journaled upon the driven shaft and is extended to receive the attaching member of the manual control.

In order that my invention may be fully understood it will first be described with reference to the accompanying drawings and afterward pointed out more particularly in the annexed claims.

In said drawings:

Figure 1 is a side elevation, partly in vertical longitudinal section, of my improved friction clutch;

Fig. 2 is a vertical transverse sectional view of the same taken on the line 2—2 of Fig. 1;

Fig. 3 is a longitudinal sectional view of the spring supporting tubular member upon which the cam-carrying spider is mounted;

Fig. 4 is a detail view of one of the floating cam members detached from its mounting; and Fig. 5 is a detail view, partly in section, showing the arrangement of a foot lever for operating the clutch.

5 is a cylindrical drum or casing of the improved frictional clutch. This clutch casing 5 is formed at its front end with an annular perforated flange 6, by which the casing is adapted to be rigidly mounted upon the face of the fly wheel of an automobile or other engine. Neither the driving shaft nor the fly wheel is shown in the drawings. The front wall of the casing 5 is formed with an inwardly presented hub member 7, between which and the reduced end 8, of a driven shaft 9, is mounted a circle of ball bearings shown at 10. This is a common form of mounting between the driving member and the driven shaft of a clutch.

The casing 5 is part of the driving member of my improved friction clutch. Mounted concentrically within the clutch member 5 is the inner or driven clutch member 15 in the form of a heavy ring of metal provided with an extended hub 16, suitably mounted upon and keyed to the driven shaft 9, above referred to. Mounted between the driving member 5 and driven member 15 is the clutch "pack" of usual construction and consisting of a series of circular plates 20, mounted upon member 15 and properly keyed thereto to rotate therewith and a second series of circular plates 21 interposed between the plates 20 and properly keyed by ribs 26 to the inner wall of the cylindrical clutch member 5. A ring shaped follower 25 is also mounted within the clutch member 5 and the inner faces of the front wall of member 5 and the follower 25, as well as both faces of each of the plates 21 are provided with suitable lining facings, such as the well known woven wire and asbestos fabric. The follower 25 is loosely keyed to the inner face of member 5 by ribs 26 to cause it to rotate therewith. Projecting axially from the face of the follower 25 is a series of posts 30 extending freely through openings in a retaining ring 31, which engages suitable shoulders upon the inner face of clutch member 5, (the ring 31 may conveniently engage the ends of the ribs 26 secured to the inner face of the member 5), spiral springs 32 being mounted upon the posts 30 and confined by heads 30ª in engagement with the ring 31. The purpose of the springs 32 is to tend to retain the follower 25 in retracted or clutch released position.

A dished rear wall 35 is secured to the clutch member 5 by suitable means, such as the set screws 36, shown. This rear wall 35 is formed with an enlarged hub 37 internally threaded at 38 to receive the external threaded hub 39, formed integral with the circular plate 40, which constitutes the adjustable fulcrum for the floating cams of the operating mechanism. An extension of the hub 39 of said member is provided with a series of radial holes 39ª for the reception of a pin wrench by which the member 39 40 can be screwed inwardly or outwardly in the clutch casing to effect the desired axial adjustment of the operative parts.

This adjustable fulcrum plate 40 has secured to it a series of three U-shaped guide members 50, each of which has arms 51 riveted to plate 40 as shown at 52 and cam guiding lugs 53 between which one of the clutch operating floating cams 95 operates, in the manner that will presently be explained. These cam guides 50 are secured upon the inner face of fulcrum plate 40 at equal distances from each other and from the center of the driven shaft 9.

A tubular clutch operating member 60, formed with an enlarged bore 61 adjacent one end to freely slide over the hub 16 of driven clutch member 15, and having secured within its central shouldered bore 62 a bronze graphite bearing shell 63, bearing upon the driven shaft 9. The bearing shell 63 is held in place in the tubular member 60 by means of a set screw 64. The reduced end 65 of tubular member 60 supports the clutch operating ring hereinafter referred to.

This tubular member 60, bears upon the driven shaft 9 and is free to rotate and to slide longitudinally thereon.

The tubular member 60 has formed integral with its inner flanged end a deep circular flange or collar 80, which extends rearwardly concentric with member 60 and forms therewith an annular recess or pocket to receive the inner end of a strong expansion spring 75, which surrounds member 60 within adjustable hub 39. A collar 39ᵇ projects inwardly concentric with hub 39 and forms an annular pocket therein for the reception of the rear end of spring 75. In this manner the spring 75 is confined between the telescoping members 39—40 and 60, one of which is adjustably but rigidly mounted upon the rear wall of clutch member 5, while the other is actuated by the spring and carries the clutch operating mechanism which will now be described.

Secured upon this flange 80 is a ring or spider 85, formed at its inner edge with equidistant radially projecting lugs 86, upon which the clutch operating cam members are pivotally mounted. These ears or lugs 86 have openings bored through them tangentially to the flange 80 and seated in said tangential bearing openings are the axles 87, upon which are journaled the bearing lugs 90 of the inner U-shaped ends of cam arms 91 formed with the integral ovate-shaped cams 95 which rest in the guides 50 between the fulcrum plate 40 and follower 25 above described. The opposite ends of cams 95 are curved as shown to engage with a minimum of friction the bearing faces of plate 40 and follower 25, the rocking of said cams between said members causing the follower 25 to be wedged away from fulcrum plate 40 with a resultant application of pressure to the clutch "pack."

Mounted upon the reduced end 65 of tubular member 60 is the clutch operating ring 100 provided with the usual anti-friction ball bearings 101 between it and the clutch operating member 60. This ring 100 is engaged by the clutch operating yoke arms 105, projecting from the yoke 106 journaled upon a transverse shaft 107 shown in Fig. 5. This yoke 106 is engaged in any suitable manner by a foot lever 110.

The operation of the device will be clear from the following explanation.

When the foot lever 110 is released, the spring 75 expands between the hub 39 and the flanged end of tubular member 60 to force the pivot ends of the cam arms toward the clutch and cause the cams 95 to rock between the fulcrum plate 40 and follower plate 25. The result of this action will be the setting of the clutch, due to the pressure upon the friction plates. When it is desired to release the clutch, pressure is applied to treadle 110, which pulls member 60 outwardly to compress spring 75 and remove the pressure from the clutch pack.

As parts of the clutch wear and become loose, it is only necessary to screw up the hub 39 of fulcrum plate 40 to bring plate 40 and follower 25 closer together. This adjustment carries with it the parts of the clutch operating mechanism, so that the single adjustment is all that is necessary to take up for wear.

The simplicity and strength of construction, together with the efficiency and ease of operation are important considerations in the improved construction of friction clutch.

I claim:

1. In a friction clutch, the combination of a driving member, a driven member, a clutch "pack" arranged between the driving and driven members, a follower plate arranged to act upon the clutch "pack", a clutch casing carried by one of said members, a dished rear wall upon said clutch casing formed with an internally threaded hub, a fulcrum plate supported within said casing and formed with an externally threaded hub, said fulcrum plate hub being adjustably mounted in the threaded hub of said casing rear wall, means for adjusting the fulcrum hub in the casing hub, an axially movable clutch operating member, and a series of floating rocker cams supported between said fulcrum plate and said follower and pivotally connected to and supported by said clutch operating member.

2. In a friction clutch, the combination of a driving member, a driven member, a clutch "pack" arranged between the driving and driven members, a follower plate arranged to act upon the clutch "pack," a clutch casing carried by one of said members, said casing having a rear wall formed with an internally threaded hub, a fulcrum plate supported within said casing and formed with an externally threaded hub, which is adjustably mounted in the threaded hub of said rear wall, means for adjusting the fulcrum hub in the casing hub, an axially movable flanged tubular clutch operating member telescoping with said fulcrum hub, an operating spring confined between the flanged end of said operating member and said fulcrum hub, and a series of floating rocker cams supported between said fulcrum and follower plates and pivotally connected to and supported by the clutch operating member.

WILLIAM G. HAWLEY.